US009444275B2

(12) United States Patent
Huang et al.

(10) Patent No.: US 9,444,275 B2
(45) Date of Patent: Sep. 13, 2016

(54) INTELLIGENT INTEGRATED BATTERY MODULE

(75) Inventors: Qin Huang, Cary, NC (US); Yu Du, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 676 days.

(21) Appl. No.: 13/600,280

(22) Filed: Aug. 31, 2012

(65) Prior Publication Data
US 2013/0234669 A1 Sep. 12, 2013

Related U.S. Application Data

(60) Provisional application No. 61/529,390, filed on Aug. 31, 2011.

(51) Int. Cl.
*H02J 7/00* (2006.01)
*G08B 21/00* (2006.01)
(Continued)

(52) U.S. Cl.
CPC ............ *H02J 7/0029* (2013.01); *H02J 7/0068* (2013.01); *H02J 7/34* (2013.01); *G08B 21/00* (2013.01); *H02J 7/04* (2013.01); *H02J 7/16* (2013.01)

(58) Field of Classification Search
CPC ............... H02J 7/00; H02J 7/04; H02J 7/16; H02J 7/06; H02J 7/24; H02J 7/34; H02J 3/32; H02J 1/00; H02J 7/006; H02J 7/0029; H02J 1/008; G08B 21/00
USPC ....... 320/126, 134, 136, 138, 152, 159, 162, 320/164; 340/636.1, 636.21; 307/44, 48, 307/82, 46
See application file for complete search history.

(56) References Cited

U.S. PATENT DOCUMENTS 3,944,847 A * 3/1976 Kinnear .................... 307/131
4,052,647 A * 10/1977 Thompson .................... 318/139
(Continued)

FOREIGN PATENT DOCUMENTS

WO  WO 2010/0150667 A1 * 12/2010 ............ H01M 10/48
WO  WO 2011/043172 A1 * 4/2011 ............... H02J 7/02

OTHER PUBLICATIONS

Du, Yu et al., High-frequency High-efficiency DC-DC Converter for Distributed Energy Storage Modularization, IEEE, IECON 2010 36th Annual Conference, Nov. 7-10, 2010, p. 1832-1837 and The Second FREEDM Systems annual conference, May 18-20, 2010.
(Continued)

*Primary Examiner* — Phallaka Kik
(74) *Attorney, Agent, or Firm* — Olive Law Group, PLLC

(57) ABSTRACT

An energy storage system is provided. The system includes a plurality of energy storage modules connected in parallel. Each energy storage module has an energy storage source, a bidirectional current converter configured for supplying charge to the energy storage source from a power source and for discharging current for use by an electrical device, a monitoring module for monitoring the energy storage source and the current converter, and a controller configured to control the current converter based upon monitored characteristics of the storage source and the current converter to produce a respective output signal for each module. A communications module is in connection with each output signal of the energy storage modules and configured for communicating a combined output signal with one of the power source and the electrical device.

20 Claims, 14 Drawing Sheets

(51) Int. Cl.
*H02J 7/34* (2006.01)
*H02J 7/04* (2006.01)
*H02J 7/16* (2006.01)

(56) References Cited

U.S. PATENT DOCUMENTS

| | | | | |
|---|---|---|---|---|
| 5,798,633 | A * | 8/1998 | Larsen et al. | 323/207 |
| 5,808,448 | A * | 9/1998 | Naito | 322/13 |
| 6,118,248 | A * | 9/2000 | Gartstein et al. | 320/107 |
| 6,380,715 | B1 * | 4/2002 | Kubo | 320/128 |
| 8,384,343 | B2 * | 2/2013 | Kojori et al. | 320/104 |
| 8,441,228 | B2 * | 5/2013 | Brabec | 320/104 |
| 9,041,354 | B2 * | 5/2015 | Lee | 320/134 |
| 9,102,241 | B2 * | 8/2015 | Brabec | B60L 11/1861 |
| 2004/0026140 | A1 * | 2/2004 | Suzuki et al. | 180/65.2 |
| 2005/0285564 | A1 * | 12/2005 | Mathews et al. | 320/116 |
| 2006/0220601 | A1 * | 10/2006 | Horii | 318/139 |
| 2007/0047100 | A1 * | 3/2007 | Takahashi et al. | 359/689 |
| 2010/0188049 | A1 * | 7/2010 | Haddani et al. | 320/134 |
| 2010/0231170 | A1 * | 9/2010 | Davis et al. | 320/136 |
| 2010/0237699 | A1 * | 9/2010 | Gibson et al. | 307/39 |
| 2011/0070467 | A1 * | 3/2011 | Meintschel et al. | 429/7 |
| 2011/0089899 | A1 * | 4/2011 | Xu et al. | 320/118 |
| 2011/0140520 | A1 * | 6/2011 | Lee | 307/25 |
| 2011/0140667 | A1 * | 6/2011 | Moon | 320/134 |
| 2011/0148195 | A1 * | 6/2011 | Lee | 307/25 |
| 2011/0148360 | A1 * | 6/2011 | Lee | 320/134 |
| 2012/0056591 | A1 * | 3/2012 | Abe et al. | 320/132 |
| 2012/0074949 | A1 * | 3/2012 | Kepley et al. | 324/426 |
| 2012/0140538 | A1 * | 6/2012 | Martinelli | 363/127 |
| 2012/0169291 | A1 * | 7/2012 | Abe et al. | 320/134 |
| 2012/0176082 | A1 * | 7/2012 | Lee et al. | 320/103 |
| 2012/0206104 | A1 * | 8/2012 | Tsuchiya | 320/134 |
| 2012/0262133 | A1 * | 10/2012 | Martinelli | 323/234 |

OTHER PUBLICATIONS

Related U.S. Appl. No. 13/595,883, filed Aug. 27, 2012; not yet public.

Conference Paper from Nov. 15, 2010 conference held at the FREEDM Systems Center, NCSU, Transformer-Isolated Soft-switched Single-stage AC-DC Converter.

Falcones S., Mao X., Ayyanar R.; Topology Comparison for Solid State Transformer Implementation; Jul. 2010; IEEE, pp. 1-8.

* cited by examiner

INTELLIGENT INTEGRATED BATTERY MODULE

CROSS-REFERENCE TO RELATED APPLICATIONS

This application claims priority to U.S. Provisional Application No. 61/529,390 filed on Aug. 31, 2011, the contents of which are hereby incorporated by reference in their entirety.

FEDERALLY SPONSORED RESEARCH OR DEVELOPMENT

This invention was made with government support under grant number EEC-08212121 awarded by the National Science Foundation. The government has certain rights to this invention.

TECHNICAL FIELD

The present disclosure is directed towards energy storage modules connected in parallel and integrated with high-frequency, high-efficiency, bidirectional DC-DC or DC-AC converters and control systems to provide high voltage output. The devices disclosed herein may be particularly advantageous for use in electric vehicles and in utility energy storage.

BACKGROUND

A battery is one of the most important energy storage devices in high-power or high-capacity energy storage applications such as electric vehicles, and in renewable energy generation systems such as distributed wind and photovoltaic (PV) power generation. A battery may be used to smooth intermittent power generated from distributed energy resources, and to make generated power more distributable. In conventional high-power battery packs, battery cells are connected in series to increase the battery output voltage, making it is easier and more efficient to interface with a high voltage system DC bus.

Major challenges for conventional batteries include cost, cell capacity and life, power density, energy density, and safety. Variations in battery cell capacity and internal resistance are inevitable both in manufacturing process and during operation. This imposes unnecessary costs in terms of money and efficiency. For example, during the charging process, battery cells with lower capacity are charged more quickly than those with larger capacity. Therefore, even though the lower capacity cells may reach their maximum voltage cell voltage, they must continue to be charged so that the higher capacity cells can reach their maximum voltage. This further charging causes the weaker cells to overcharge, and causes irreversible damage to the electrodes of the weaker cells, which results in a decreased battery capacity. Therefore, weaker battery cells degrade much faster than stronger ones, and the presence of weaker cells reduces the operational capacity and lifetime of the entire battery. A similar outcome occurs as a result of the discharging process. Improving the manufacturing process or controlling ambient conditions for better cell consistency involves significant increases in cost.

There are a few conventional approaches to mitigate these issues and improve battery pack performance. One such approach is a battery management system (BMS), which acquires and processes operational cell characteristic data. Typical monitored characteristics include cell voltage, cell temperature, and operating current. Typical functionalities include over-voltage and under-voltage protection, over-temperature protection, and over-current or short circuit protection. Advanced BMS also estimates the state of charge (SOC) and the state of health (SOH) of a battery pack, and relays the states to an external controller. A major issue for this approach is that, in order to minimize cell damage and extend battery life, only part of the rated battery pack capacity can be used. For example, in today's on-board lithium ion battery pack of a typical plug-in electric vehicle (PHEV), only 50% of the battery pack capacity is usable.

A second approach is cell equalizer technology. Cell equalizer technology avoids over-charging or over-discharging by directing current away from weaker cells when they charge to their maximum capacity, and by directing current to weaker cells when they discharge to their minimum voltage threshold. Early equalizer technology employs dissipative balance circuits such as resistors and transistors in low power applications. Since there is high power loss in a dissipative equalizer, the directed current is usually very small compared with the battery current rating, and they can balance cell voltage only during trickle charging. At the end of the charging process, trickle charging with very small current is employed to further charge stronger cells, and to direct current away from weaker cells. But trickle charging may not be applicable to lithium ion batteries because they are sensitive to over-voltage.

Non-dissipative technologies were proposed for high-power applications. For example: a switched capacitor design or a switched inductor design, a DC-DC converter design, a coupled inductor or high-frequency transformers design, and a relay switch matrix design. The directed current flow can be either unidirectional for charging equalization, or bidirectional for both charging and discharging equalization. There are several issues for non-dissipative cell equalizers such as DC-DC converters. For example, there is trade-off between the cost of an equalizer and the equalization speed. An equalizer with a higher current rating can provide faster equalization speed and balance voltage dynamically with inrush current (e.g., regenerative braking of electric vehicle). But this approach will generate additional cost, volume, and weight of the energy storage system. Most reported equalization times are in the order of magnitude of minutes to hours, which is difficult for the transient voltage balance of high power battery cells. Another issue is the reliability of the battery. When one battery cell fails, the cell equalizer circuits have to provide a bypass branch to isolate the failed cell, to ensure that the battery remains operable. However, it is difficult to directly utilize equalizer circuits to provide bypass branches. In addition, the current rating of bypass branches should be the same as the maximum output current of the battery. Such branches are not cost effective because they are in standby during normal operation. Another issue is with the control algorithm. The equalizer circuits operate by reallocating energy among battery cells, however, allocating energy efficiently and quickly will result in a complicated control system.

Therefore, a need exists for one or more electric power systems and devices that address the issues associated with the conventional approaches for energy power source management.

SUMMARY

This Summary is not intended to identify key features or essential features of the claimed subject matter, nor is it intended to be used to limit the scope of the claimed subject matter.

According to one or more embodiments, an energy storage system is provided. The system includes a plurality of energy storage modules connected in parallel. Each energy storage module has an energy storage source, a bi-directional current converter configured for supplying charge to the energy storage source from a power source and for discharging current for use by an electrical device, a monitoring module for monitoring the energy storage source and the current converter, and a controller configured to control the current converter based upon monitored characteristics of the storage source and the current converter to produce a respective output signal for each module. A communications module is in connection with each output signal of the energy storage modules and configured for communicating a combined output signal with one of the power source and the electrical device.

According to one or more embodiments, each monitoring module is configured to monitor at least one of voltage, current, power, discharge rate, charge rate, temperature, and charge capacity of the energy storage source and each controller is configured for switching an output contactor of a respective energy storage module based on the monitored characteristics.

According to one or more embodiments, the controller is configured for switching off the output contactor of each respective energy storage module if the monitored voltage of a respective energy storage module is below a predetermined range.

According to one or more embodiments, each monitoring module is configured to determine if one of the energy storage sources has failed and each controller is configured for switching the contact of a respective energy storage module to open if it is determined that one of the energy sources has failed.

According to one or more embodiments, the system includes a system master controller configured for communication with the communications module and each controller of each energy storage module.

According to one or more embodiments, the system master controller is configured to regulate the output signal for each energy storage module.

According to one or more embodiments, the system master controller is configured for controlling the communications module to charge respective energy storage modules with the power source.

According to one or more embodiments, controlling the communications module to charge respective energy storage modules with the power source includes charging respective energy storage modules with one of constant current and constant voltage.

According to one or more embodiments, the system master controller is configured to regulate the output signal for each energy storage module to the desired combined output signal.

According to one or more embodiments, each monitoring module is independently controllable relative to other monitoring modules.

According to one or more embodiments, the converter is one of a bidirectional DC-DC converter, a bidirectional DC-AC converter, a current amplitude converter, or voltage amplitude converter.

According to one or more embodiments, the energy storage source comprises at least one of batteries, capacitors, photovoltaic arrays, and power grids.

According to one or more embodiments, a method of controlling an energy storage system having a plurality of energy storage modules connected in parallel is provided. The method includes switching an output contactor of a respective energy storage module based on a monitored characteristic of that energy storage module.

According to one or more embodiments, switching an output contactor of a respective energy module comprises switching an output contactor with a controller of each respective energy module.

According to one or more embodiments, the method includes determining if one of the energy storage sources has failed and switching the contact of a respective energy storage module to open if it is determined that one of the energy sources has failed.

According to one or more embodiments, a computer program product for enabling control an energy storage system having a plurality of energy storage modules connected in parallel is provided. The computer program product includes a computer readable storage medium having computer readable program code embodied therewith. The computer readable program code includes computer readable program code configured to switch an output contactor of a respective energy storage module based on a monitored characteristic of that energy storage module.

According to one or more embodiments, the computer readable program code is further configured to switch an output contactor with a controller of each respective energy module.

According to one or more embodiments, the computer readable program code is further configured to determine if one of the energy storage sources has failed and switch the contact of a respective energy storage module to open if it is determined that one of the energy sources has failed.

BRIEF DESCRIPTION OF THE DRAWINGS

For the purposes of illustration, there is shown in the drawings exemplary embodiments; however, the presently disclosed invention is not limited to the specific methods and instrumentalities disclosed. In the drawings.

DETAILED DESCRIPTION

While the disclosure of the technology herein is presented with sufficient details to enable one skilled in the art to practice the invention, it is not intended to limit the scope of the disclosed technology. The inventors contemplate that future technologies may facilitate additional embodiments of the presently disclosed subject matter as claimed herein. Moreover, although the term "step" may be used herein to connote different aspects of methods employed, the term should not be interpreted as implying any particular order among or between various steps herein disclosed unless and except when the order of individual steps is explicitly described.

In high-power applications, conventional energy storage systems generally include battery cells, a battery control subsystem, cell equalizers, and one external, centralized, high-power, bidirectional DC-DC converter which allows for a voltage change of a battery, and regulates the system DC-link voltage.

Disclosed herein are one or more embodiments for an energy storage system integrated with distributed high-voltage gain, high-frequency, high-efficiency, bidirectional converters and control systems that can fundamentally eliminate the necessity of series of battery cells, and their associated issues. One or more energy storage systems according to one or more embodiments are illustrated in FIG. 1.

Figure 1:
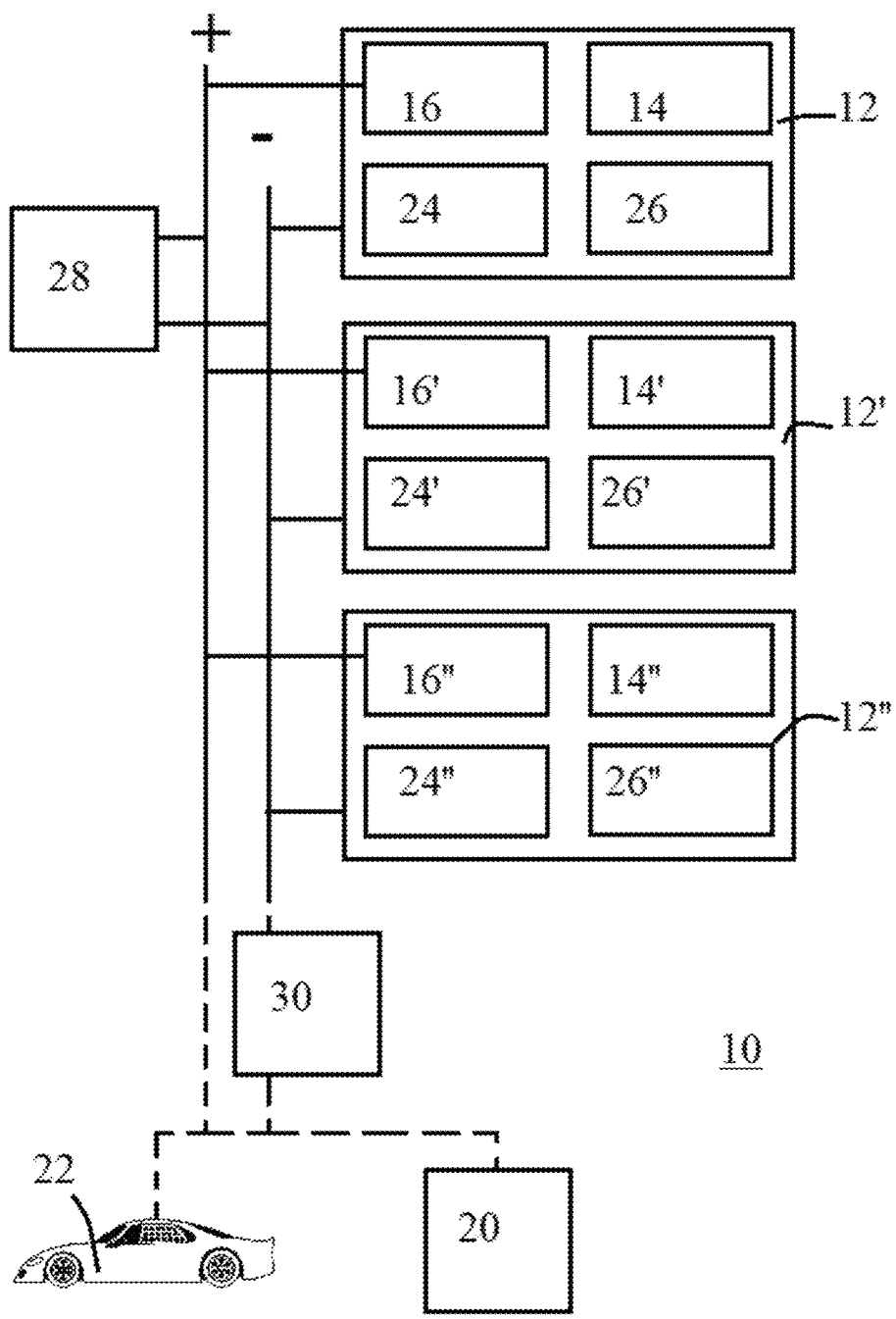
FIG. 1 illustrates a diagram of an energy storage system according to one or more embodiments disclosed herein.

As illustrated in FIG. 1, an energy storage system is provided and generally designated 10. The energy storage system 10 may include a plurality of energy storage modules 12, 12', and 12" (hereinafter collectively referred to as 12) connected in parallel with one another. Each energy storage module 12 may include an energy storage source 14, a bidirectional current converter 16 configured for supplying charge to the energy storage 14 source from a power source 20 and for discharging current for use by an electrical device 22, a monitoring module 24 for monitoring the energy storage source 14 and the current converter 16, and a controller 26 configured to control the current converter 16 based upon monitored characteristics of the storage source 14 and the current converter 16 to produce a respective output signal for each module 12. A communications module 30 may be in connection with each output signal of the energy storage modules 12 and configured for communicating a combined output signal with one of the power source 20 and the electrical device 22.

The converter 16 may be a low power bidirectional DC-DC converter which are distributed and integrated with energy storage sources 14, such as, for example, battery cells or short string packs. The distributed converters 16 enable direct charging and discharging of the energy storage sources 14. The controller 26, which may have similar or simplified functions as conventional battery management system (BMS), may be combined with an integrated converter. The distributed converters 16 can boost low cell voltage, or small pack voltage, up to a desired or required system DC-link voltage level. These energy storage modules 12 can be paralleled at the output to form a battery energy storage system. Series connection of modules 12 and the combination of series and parallel configuration are also possible for the energy storage system with integrated energy storage modules according to one or more embodiments disclosed herein.

Figure 2:
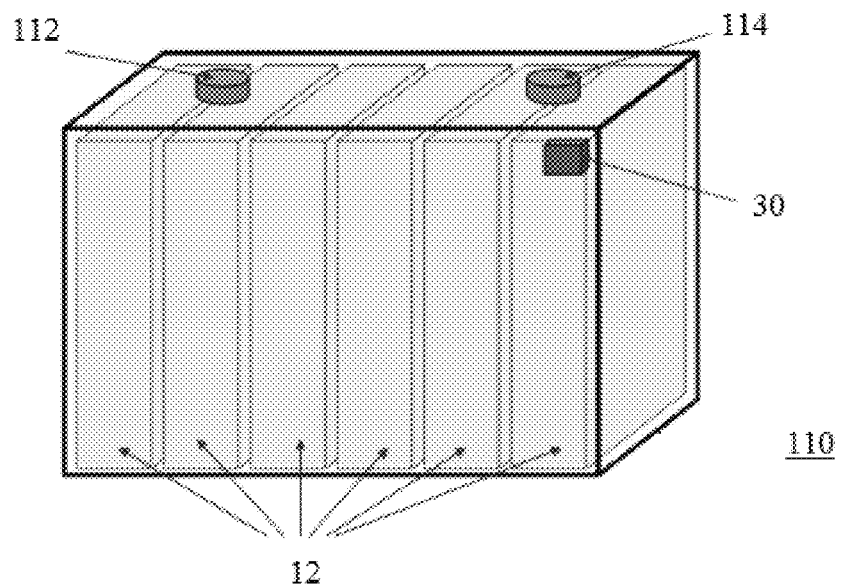
FIG. 2 illustrates an energy storage assembly using an energy storage system according to one or more embodiments disclosed herein.

One or more embodiments of an energy storage system embodied as a battery pack 110 with integrated energy storage modules 12 is illustrated in FIG. 2. The battery pack 110 includes a positive power terminal 112 and a negative power terminal 114, which may appear the same as, or similar to, conventional battery packs. The communication module 30 exchanges information with the master system controller and initiates an operation mode of the energy storage modules or energy storage system. A few integrated energy storage modules 12 may be connected in parallel inside the battery pack 100. The operation modes of the energy storage modules 12 or energy storage system include the voltage regulation mode, current regulation mode, and power regulation mode.

In one or more embodiments, the energy storage system 10 can regulate the DC bus voltage. For example, when it is used as an energy storage system in plug-in hybrid electric vehicles (PHEVs) such as electrical device 22. A 400V constant output voltage can be regulated by a DC-DC converter in the energy storage module in such applications. In other embodiments, the system DC bus, such as communications module 30, is regulated by additional converters, and the energy storage system 10 will provide the required current or power injection or absorption based on a system command, or a command from a master system controller. With distributed and integrated high frequency DC-DC converters, no external, centralized high power DC-DC converter is required. The energy storage system 10 can be directly connected to the communications module 30. In addition, an external DC power source can be used to charge the energy storage modules 12, instead of a more expensive battery charger. By using energy storage modules 12, the capacity of the energy storage systems can be easily configured based on the customer requirement by selecting the number of modules 12 which are connected in parallel. Energy storage module voltage equalizers may be eliminated if a single energy storage module is used as the power source, since the integrated DC-DC converters enable direct module or cell level management.

A control system may also be integrated into the energy storage module 12 to monitor the module's voltage, current, and temperature, and to communicate the module's state of charge (SoC), state of health (SoH), and state of function (SoF) information with a master system controller 28. The system controller 28 may be configured for communication with the communications module 30 and each controller 26 of each energy storage module 12. In one or more embodiments, the system master controller 28 may be configured to regulate the output signal for each energy storage module 12. In one or more embodiments, the system master controller 28 is configured for controlling the communications module 30 to charge respective energy storage modules 12 with the power source 20. This charging may be accomplished with one of constant current and constant voltage.

While in one or more embodiments the converter 16 is a DC-DC converter, it can also be a DC-AC converter, and it may convert waveform functions of the output power signal.

The energy storage system 10 disclosed herein holds several advantages over conventional power management systems. Module or cell level management can tolerate large variations in module parameters, which helps to reduce the manufacturing cost. The energy storage modules can even accommodate multiple types of energy storage sources 14, such as battery cells and super capacitor cells in one energy storage system. The operational life of the energy storage system 10 can be extended since there is no over-charging or over-discharging module damage due to module imbalance. The capacity of the energy storage system 10 can be more effectively utilized because each module 12 can be charged and discharged within a greater SoC range, while being restricted to a safe operating range by its integrated converter and control system. In conventional energy storage systems, the available storage capacity is limited to lower values due to weaker cells. In conventional energy storage systems with many power sources in series, the system's capacity loss is typically 20-30%. In the energy storage systems 10 disclosed herein, the capacity loss is much smaller, and can even be lossless if a single module is used. The reliability of energy storage system 10 is greatly improved by its parallel structure, as opposed to the series structure associated with conventional devices. This is because when one module fails it can be easily isolated, and the energy storage system still maintains most of its capacity with the rest of the paralleled modules staying on-line.

In the one or more systems and devices disclosed herein, when one energy storage module 12 fails, integrated converter 16 can isolate the storage module from the DC bus or communication module 30. Accordingly, only the failed energy storage module is taken off-line; the remaining modules stay on-line in communication with the DC bus. As a result, the energy storage system 10 only loses a small portion of the energy storage capacity. The safety of the energy storage system 10 is improved as well. For example, some weaker modules may have relatively high internal resistances. In such cases, the converter 16 and controller 26 can allocate smaller charging or discharging current to the modules 12, thereby preventing thermal runaway or explosion. Since there is no cell unbalance if a single cell is used in the module, cell equalizers are not necessary. Because of the distributed converters 16, the output voltage of the energy storage system can be regulated over a wide voltage range based on customer requirement. Additionally, the plug and play function of the energy storage systems 10 can be realized with intelligent module control systems.

The one or more energy storage systems 10 disclosed herein may solve many issues of conventional battery packs. The energy storage system 10 disclosed herein may have additional characteristics aimed at alleviating inefficiencies associated with integrated bidirectional converters. For example, practical converter efficiency should be above 90%. Such efficiency rates can be achieved through the use of soft switching. Since the energy storage modules' voltages are low, synchronous rectification can be employed to improve converter efficiency. There is often demand to boost the power density and energy density of the battery packs. With integrated, high frequency DC-DC converters, the power or energy density of the proposed energy storage system is at least comparable to the density of a conventional energy storage system configuration utilizing a battery string and centralized high-power DC-DC converter. In order to increase the power density of the DC-DC converters, high-switching frequencies may be selected to reduce the volume and weight of the integrated DC-DC converters. Furthermore, the modularization methodology can potentially save manufacturing and engineering cost. Other approaches to reduce the integrated battery module cost may include mass production, and the implementation of control and BMS circuits on an integrated circuit (IC) chip.

Figure 3A:
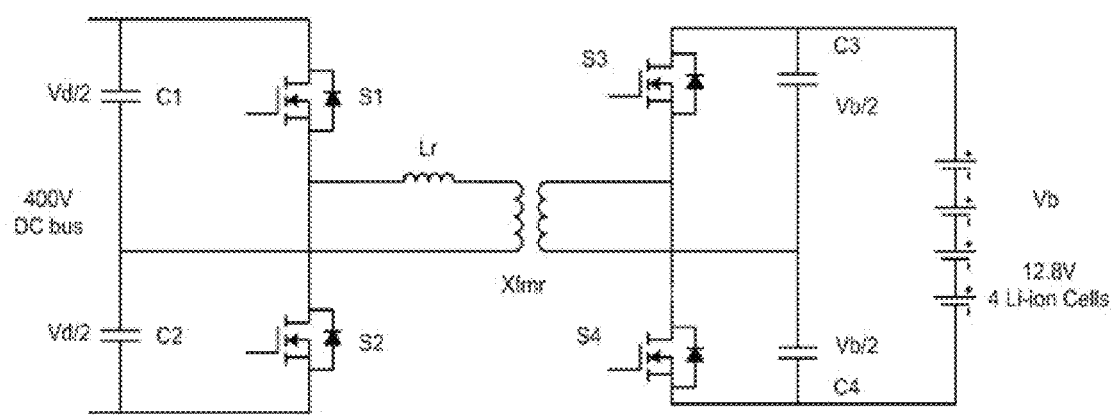
FIG. 3A illustrates a converter circuit for use within an energy storage system according to one or more embodiments disclosed herein.

One circuit configuration for a DC-DC converter for an energy storage system is illustrated in FIG. 3A and generally designated 210A. Because the DC-DC converter is required to both charge and discharge the energy storage modules 12, it should be bidirectional, though, in one or more embodiments, a unidirectional converter may be employed. As illustrated, there is a large voltage difference between the energy storage system and the electric device DC bus. Specifically, a typical DC bus voltage is 400V, while the battery side voltage is 12.8V if the use of a 4-cell Li-ion battery pack is assumed. The high voltage gain across the device may be achieved with a high-frequency transformer. There are several non-isolated bidirectional DC-DC circuit configurations, as well as several hard switching transformer isolated circuits such as flyback, forward, and push-pull, which are often used in commercial telecommunication power supplies with relatively low-switching frequency. For higher switching frequency ranges, resonant converters or soft switching converters generally achieve better performance. However, it is difficult for resonant DC-DC converters to handle bidirectional power flow. However, dual active half bridge (DAHB) circuits can be used, as shown in FIG. 3. For instance, if a switching frequency is selected, and all the MOSFETs are soft switched, the low voltage side switches may operate as synchronous rectifiers without additional current sensing or a control circuit. The transformer can step up the voltage with a large turn ratio. By selecting an appropriate phase shift angle between the high-voltage bridge and low-voltage bridge, both the direction and the magnitude of power flow can be controlled.

As illustrated in FIG. 3A, the circuit includes a first capacitor C1 and a second capacitor C2 on the high-voltage side. First switch S1 and second switch S2 may also be provided, along with an inductor Lr. A transformer Xfmr connects to the low voltage side, which includes a third capacitor C3, four Li-ion cells that collectively form Vb, and third capacitor C3 and fourth capacitor C4. Switches S3 and S4 may also be provided.

Figure 3B:
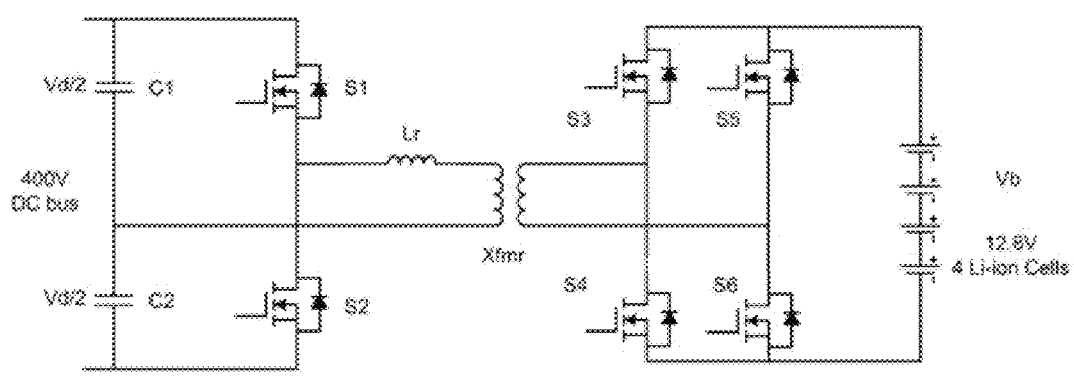
FIG. 3B illustrates a converter circuit for use within an energy storage system according to one or more embodiments disclosed herein.

An alternate embodiment of a circuit is illustrated in FIG. 3B in which capacitor C3 and capacitor C4 are replaced with switches S5 and S6, respectively, and the circuit is generally designated as 210B. In one or more embodiments of the modulation technique of the multi-core based bidirectional DC-DC converter, on the high-voltage side half bridge, S1 and S2 conduct alternatively with 50% duty cycle. On each low-voltage side full bridge, S3 and S6 conduct simultaneously, and S4 and S5 conduct simultaneously. S3 and S4 conduct alternatively for half the time in each switching cycle. Similarly, S5 and S6 conduct alternatively for 50% of the time. In each section, the gate signals for the 4 full bridges may be synchronized. The high frequency AC output voltage from both the high-voltage side half bridge, and each low-voltage side full bridge, are both square waveforms with switching frequency. The voltage, current, or power regulation of the multi-core based bidirectional converter may be obtained by controlling the phase-shift angle between the high-voltage half-bridge and low-voltage full-bridges.

Figure 4:
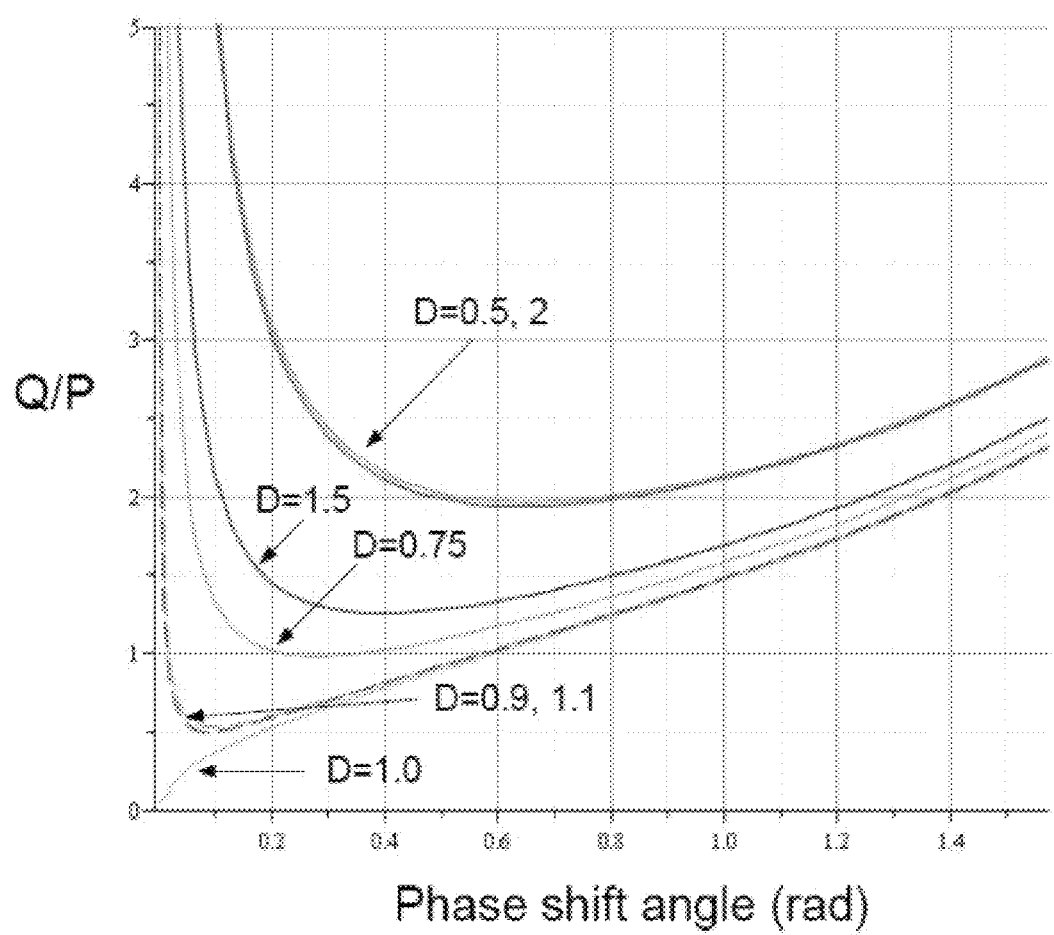
FIG. 4 illustrates a graph depicting Q/P relative to the phase shift angle (radians) of a converter according to one or more embodiments disclosed herein.

The selection of the transformer turns ratio and required leakage inductance has a large impact on the performance of dual active bridges (DAB), or dual active half bridges (DAHB), DC-DC converters. To minimize conduction loss, the circuit's reactive power should be minimized. As an illustrative example, the ratio of the reactive power (Q) to output power (P) for a DAB or DAHB converter is shown in FIG. 4, where the reactive power is defined as the product of rms current through the series leakage inductor, Lr, and the rms voltage across it. The parameter D is defined as, $$D = \frac{V_d * N_L}{V_b * N_H} \quad (1)$$

where $V_d$ is the DC bus voltage, $V_b$ is the energy storage modules voltage, $N_H$ is the number of turns for high-voltage winding, and $N_L$ is the number of turns for low-voltage winding. The transformer turns ratio is determined by the equation below (2), with D set at 1 to minimize the reactive power in the circuit, while maximizing the zero voltage switching (ZVS) range with a light load.

$$\frac{N_H}{N_L} = \frac{V_d}{V_b} = \frac{400}{12.8} = 32 \quad (2)$$

The inductance in the DAHBs can be provided by high-frequency transformer leakage inductance, such that no external inductor is required DAHB, DCDC converters. The required series inductance for a DAHB converter can be calculated by equation (3):

$$L_r = \frac{V_d^2}{8 * D * \pi^2 * f_s * P_o} * \Phi * (\pi - \Phi) \quad (3)$$

where $L_r$ is the required leakage inductance (referenced by the high-voltage side, or the electric device DC bus side); $V_d$ is DC bus voltage; D is defined in (2) (equal to a value of 1 in the current example); $f_s$ is the switching frequency (equal to a value of 200 kHz in the current example); $P_o$ is the output power of the DAHB (equal to a value of 256 W in the current example); and $\Phi$ is the phase-shift angle between two half bridges.

As shown in FIG. 4, when D is equal to 1, a smaller the phase-shift angle results in a lower ratio of reactive power (Q) to output power (P). However, as a practical matter, neither the transformer turns ratio nor the voltage regulation can be controlled very accurately. 10% variation of D (D=0.9 or D=1.1) can result in an increased reactive power ratio in a given range of small phase shift angles. A suggested maximal phase-shift angle range, corresponding to a 256 W 1 C charging or discharging rate for a 4-cell 20 Ah energy storage system, is 20°~30° or π/9~π/6 rad. Therefore, the DAHB requires an inductance of 39 uH~54 uH on the high voltage side for optimal operation. It is highly preferred that the inductance is provided by the leakage inductance of the transformer for lower volume, weight, and cost. The specifications for a prototype of a high-frequency DAHB bidirectional DC-DC converter for distributed energy storage modularization are summarized in Table I below.

TABLE I

SPECIFICATIONS OF A DC-DC CONVERTER PROTOTYPE

| | |
|---|---|
| Energy storage system nominal voltage (V) | 12.8 |
| DC bus voltage (V) | 400 |
| Energy storage system capacity (Ah) | 20 |
| 1 C charge/discharge power rating (W) | 256 |
| Bidirectional circuitry configuration | DAHB |
| Switching frequency (kHz) | 200 |
| High-voltage side MOSFETs: | SPI20N60CFD |
| Low-voltage side MOSFETs: | IRLS3034 |
| High-frequency transformer core size: | EE42/21/15 |
| Number of turns for high voltage winding | 32 |
| Number of turns for low voltage winding | 1 |
| Magnetizing inductance (referenced by the high-voltage winding side, uH) | 1018 |
| Leakage inductance (referenced by the high-voltage winding side, uH) | 45 |

Figure 5:
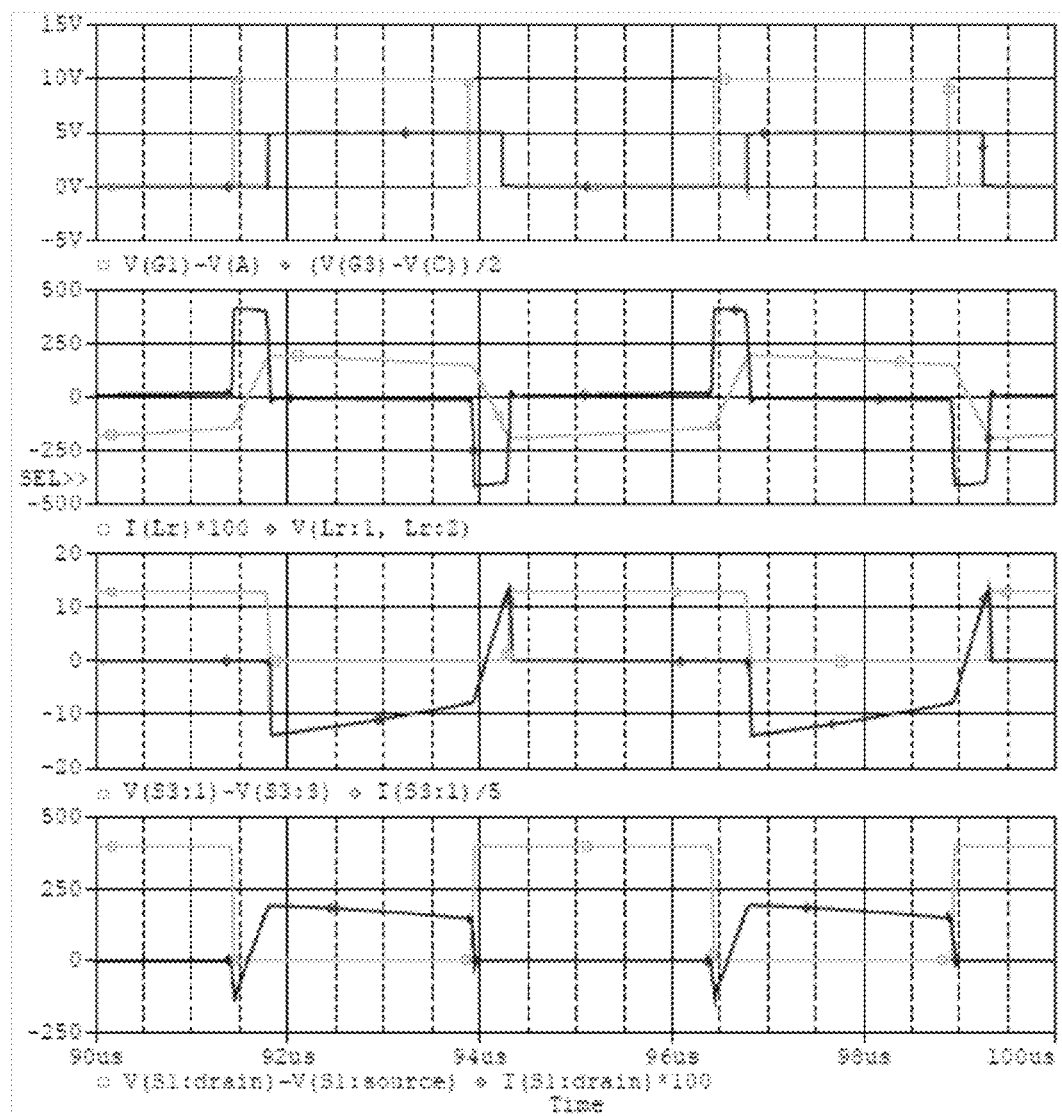
FIG. 5 illustrates the gate signal of S1 and S3, voltage and current waveforms of the series inductor Lr, high voltage side MOSFET drain current and Vds, and low voltage side MOSFET drain current and Vds for 20 A (1 C) charging current.
Figure 6:
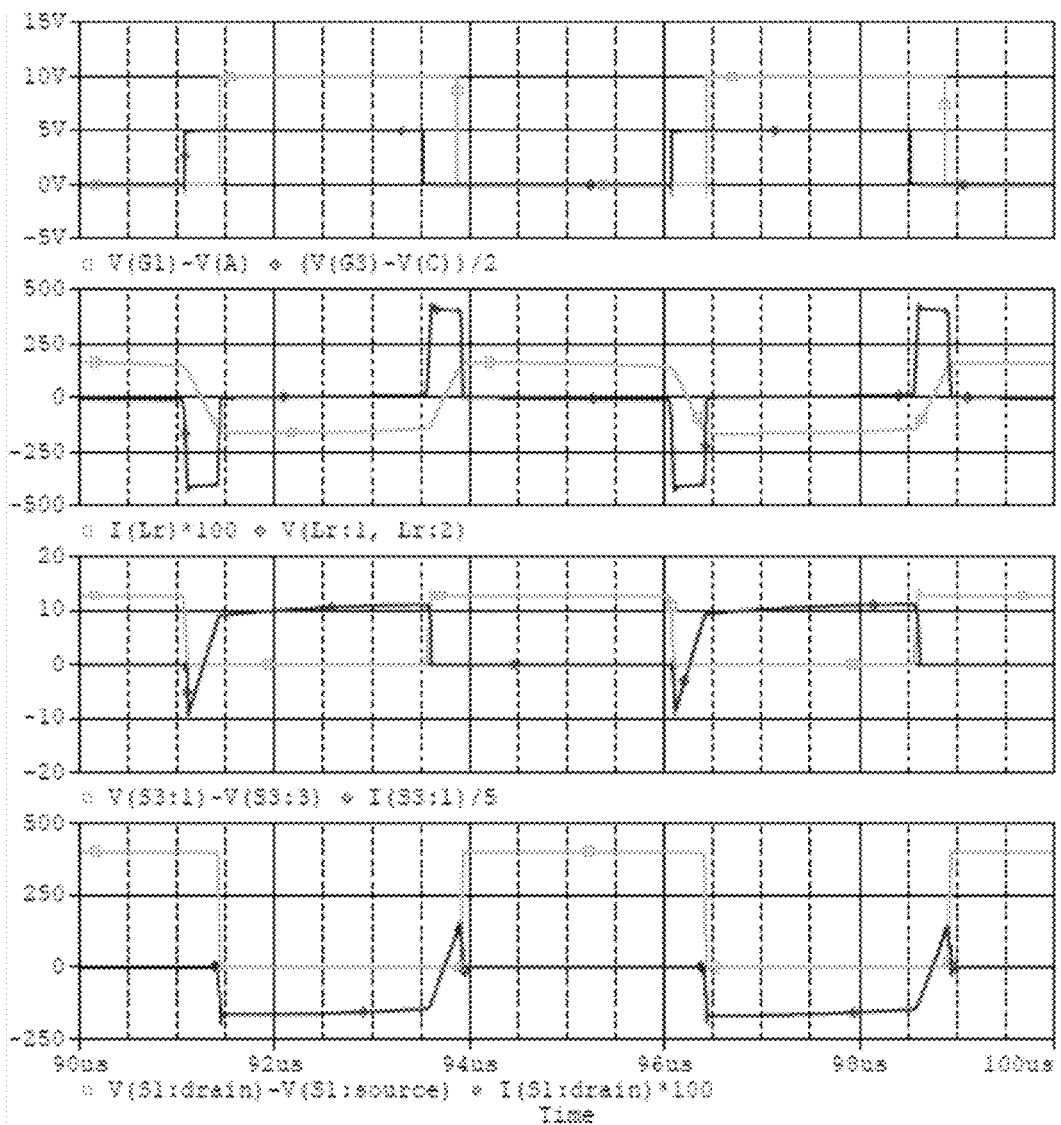
FIG. 6 illustrates the voltage and current waveforms for the 20 A discharging process.

The one or more converters may be designed for a low voltage battery pack with four 20 Ah/3.2V lithium ion batteries. The simulated waveforms of the 200 kHz 256 W bidirectional dual active half-bridge DC-DC converter to modularize a 20 Ah 4-cell Li-ion battery pack as an example integrated battery are shown in FIG. 5 and FIG. 6. FIG. 5 illustrates the gate signal of S1 and S3, voltage and current waveforms of the series leakage inductor Lr, high voltage side MOSFET drain current and Vds, and low voltage side MOSFET drain current and Vds with 20 A (1 C) charging current. FIG. 6 shows the voltage and current waveforms for the 20 A discharging process. ZVS is achieved for both the high voltage side and the low voltage side MOSFETs.

An initial experimental prototype was constructed. Two SP120N60CFD CoolMOS MOSFETs are employed as the primary side high voltage switches and two IRL3034 are used as the secondary side low voltage switches. The high frequency transformer core material is Ferroxcube 3C90 ferrite soft magnetic core material. The tested full power efficiency with initial dual active half bridge converter prototype is about 88% and efficiency decreases at light load condition. The efficiency is acceptable in terms of the low voltage of the battery pack. The power density of the prototype is about 1 kW/L. In addition, 20 A charging and discharging current is not high enough for some high capacity Li-ion battery cells. For example, 1 C charging and discharging rate of a 100 Ah battery cell requires the bi-directional converter to process 100 A current in low voltage side, which is extremely difficult. With one or more embodiments of the multi-core based bi-directional DC-DC converters disclosed here, the efficiency, the power density and the current handling capability of the integrated DC-DC converter may be greatly improved which make the performance of the integrated battery module competitive with conventional battery packs.

Figure 7:
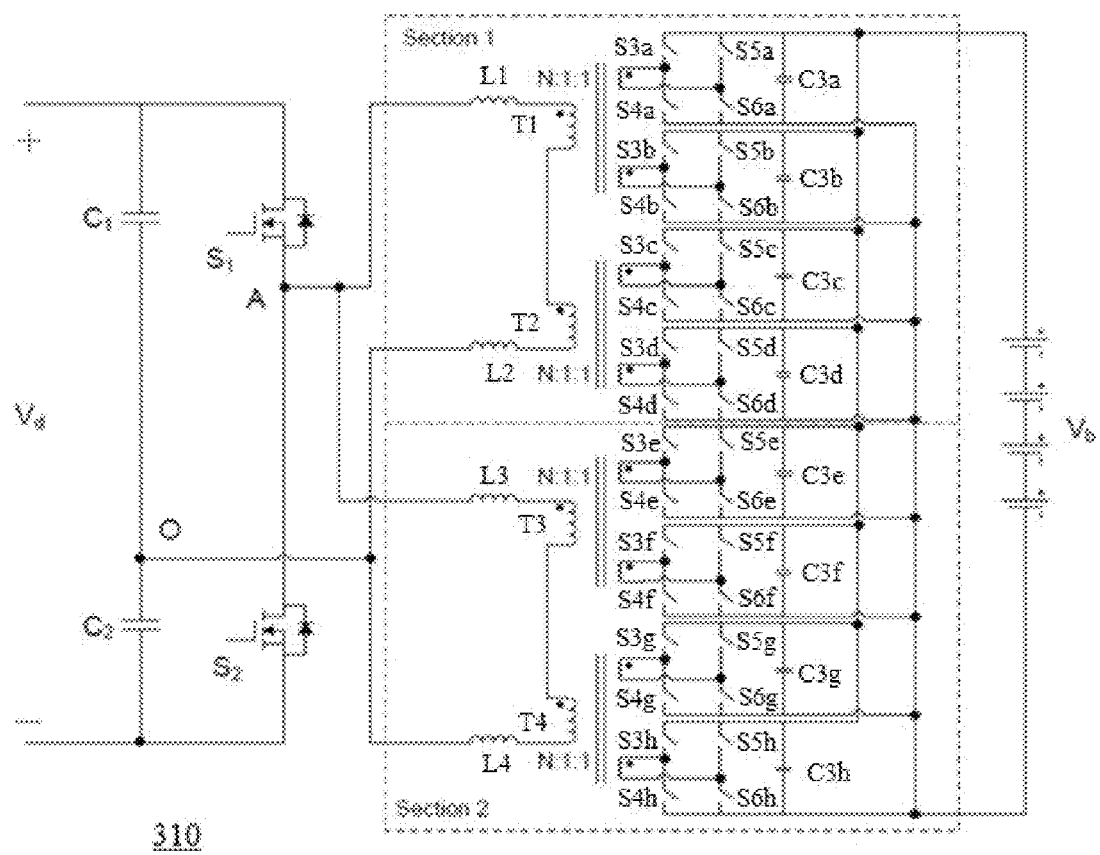
FIG. 7 illustrates a circuit configuration for one or more converters disclosed herein.
Figure 8:
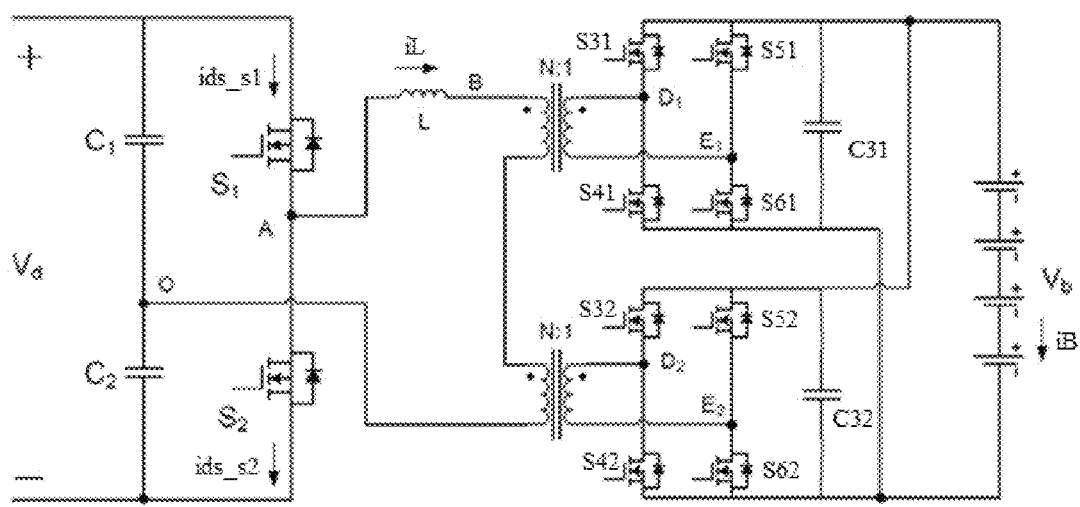
FIG. 8 illustrates a circuit configuration for one or more converters disclosed herein.

One or more multi-core based bidirectional DC-DC circuit configurations are shown in FIG. 7 and FIG. 8 that may be employed within individual energy storage modules 12 disclosed herein, with each circuit configuration being generally designated 310 and 410, respectively. One important characteristic is to minimize the component power loss in the low-voltage and high-current side of the power stage, to achieve a high power conversion efficiency. The low-voltage and high-power stage can include low-voltage transformer windings, and low voltage full bridges, and filter capacitors. It is important to minimize the transformer's winding length in order to minimize the low-voltage winding loss. Despite the multi-core geometry, using one turn in low-voltage winding results in the lowest winding resistance. Therefore, the number of low-voltage windings is set to 1 ($N_L=1$). In addition, a one turn, low-voltage winding simplifies the layout of the low-voltage full bridge, and helps to improve the power density of the converter.

Increasing the switching frequency in order to achieve a high power density of the bidirectional DC-DC converter. The number of the turns of the low-voltage winding is calculated by, $$N_L = \frac{V_{ds}}{4fA_eB_{ac}} \quad (4)$$

where Vds is the energy storage system voltage, f is the switching frequency, Ae is the cross section area of the magnetic core, and Bac is the peak magnetic flux density. Since NL is fixed to 1 to minimize the winding loss, and Bac is generally limited by the specific loss of the transformer core at high-frequency conditions, the only way to reduce the transformer core size (i.e. reducing the size of the cross section area) is to increase the switching frequency. For example, 500 kHz switching frequency may be selected for the multi-core based, bidirectional DC-DC converter to improve the power density. However, high frequency alone is not enough to achieve the high energy and power density of the energy storage modules.

A low profile and planar package of the bidirectional DC-DC converter may be desirable, since a planar package can be easily integrated into an energy storage module. In addition, a planar package has better thermal performance due to the larger ratio of surface area to volume. Therefore, planar magnetic cores may be preferred, instead of conventional magnetic core shapes.

However, the window size of a planar transformer is smaller than that of a conventional transformer. Therefore, with either PCB winding or Litz winding, it is difficult to accommodate a large number of turns. In other words, PCB winding and Litz winding cannot provide high voltage gain. For example, there is 1 turn for the low-voltage winding, but the required number of the high voltage windings is 32. It is very difficult to use planar magnetic cores to make such a transformer. The multi-core transformer structure illustrated in FIG. 7 and FIG. 8 is proposed to utilize the planar magnetic cores to achieve low profile, high power density package and high voltage gain. The large number of the high-voltage winding turns can be segmented into groups with several winding turns, which can be accommodated by the planar transformer window. Then, several windings in each planar transformer are connected in series to obtain a large voltage gain. The multi-core structure illustrated in FIG. 7 and FIG. 8 also allows the use of multiple low-voltage windings, and more MOSFETs on the low voltage and high current side. This is in accordance with the requirement to process up to 100 A of charging and discharging current, since more silicon and copper are necessary to reduce power in high current environments. Each of the multiple windings can be connected to a full bridge, thereby achieving a distributed high current winding and full bridge layout. This type of structure has two advantages. The first is to minimize the length of the high current pass. Each low voltage and high current winding can be connected to the transformer's secondary winding, where the high-frequency AC current pass is minimized with the low-voltage winding set at one turn. It is much easier to handle DC current by increasing the size of the conductor because there is no skin effect. The second advantage is to eliminate the AC termination of the low-voltage, high-current winding. AC termination causes additional power loss which may be comparable to the winding loss under some high frequency and high current conditions.

One or more multi-core based bidirectional DC-DC circuit configurations are shown in FIG. 7. Vd is the DC-link voltage (on the high-voltage side), and Vb is the energy storage modules' voltage (on the low-voltage side). The high-voltage side, or the primary side, includes of a half bridge. Advantages for the half bridge configuration on the high-voltage side include acting as a voltage doubler when in discharging mode. This will reduce the total turns of a high-voltage winding connected in series (the primary winding) by half and that may be easier to fit into a small planar transformer window. Another advantage is that the capacitor half bridge blocks the DC current path of the transformer primary winding, and helps to balance the magnetic flux in the transformer core.

Figure 10:
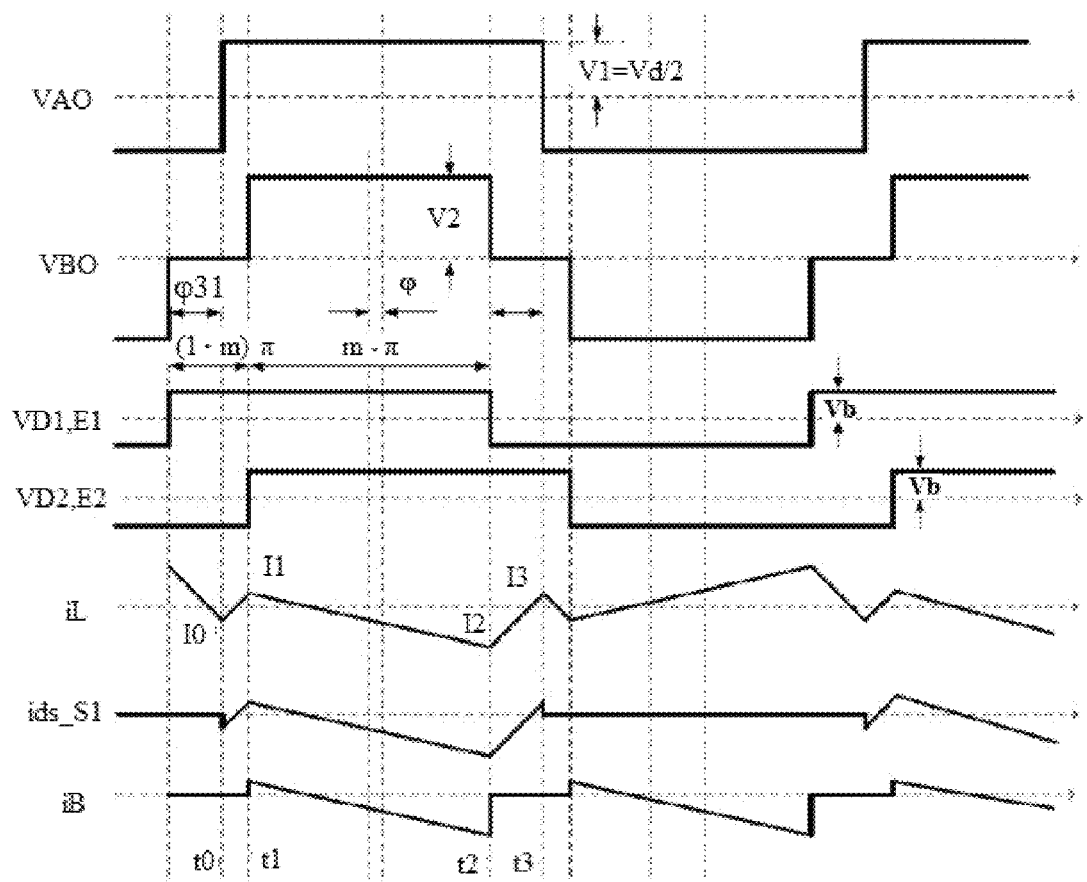
FIG. 10 illustrates one embodiment of the converter modulation techniques and output waveforms of one or more converters disclosed herein.

The low voltage side (Vb) consists of 8 full bridges with DC terminals in parallel for high battery current. Four high-frequency transformers (T1) (T2) (T3) (T4), which have one high-voltage winding and two low-voltage windings coupled together, are used to achieve a high step-up voltage ratio. Two high voltage windings are connected in series to double the voltage gain. The transformers and low voltage full bridges are grouped into two same sections. The two sections are connected in parallel at AO. The operating principle of the two sections can be exactly the same. For the two full bridges coupled with the two low-voltage windings of the same transformer, the gate signals of MOSFETs at the corresponding positions are the same. For example, the gate signals of S3a and S3b are same. Therefore, to simplify the analysis, one section of the disclosed circuit configuration in FIG. 7 can be simplified to the circuit configuration shown in FIG. 8, in which the two low-voltage windings, and two full bridges of each transformer, are "lumped" into one low-voltage winding and one full bridge In one or more embodiments of the modulation technique of the multi-core based bidirectional DC-DC converter, in addition to the phase-shift angle between the high-voltage half bridge and low-voltage full bridges, a second phase-shift angle between two full bridges coupled with a transformer in one section, and the other two full bridges coupled with the other transformer in the same section, can be utilized. With this modulation technique, multi-core based bidirectional DC-DC converter may achieve zero voltage switching (ZVS) for all the MOSFETs in full load range and wide battery pack voltage range. The operational principle of the disclosed, novel high step-up ratio bidirectional DC-DC converter is illustrated in FIG. 10, with one embodiment of the circuit configurations shown in FIG. 8. The outputs at the AC terminal of the high-voltage side half bridge, and the two low-voltage side full bridges are all square waves. VD1,E1 leads VD2,E2 by an angle of (1−m)·π such that a three-level voltage waveform can be obtained at BO with a pulse width of m·π. By referring to the center point of the waveforms VAO and VBO, a phase-shift angle ϕ, between $V_{AO}$ and $V_{BO}$, controls the direction and magnitude of the power flow.

Several planar magnetic cores may be employed. For each of the planar transformer, one turn was used for the secondary low voltage and high current winding. The one turn high-current winding can be implemented by a PCB winding with large copper track thickness. Because each low-voltage winding is connected to its full bridge with minimal distance, the secondary side low-voltage and high-current full bridge can also be implemented with a PCB. Therefore, each planar transformer can accommodate two secondary windings and the corresponding full bridges. In addition, only a two-layer PCB layout is required, which is more cost effective. As a result, for each planar transformer, there are three windings magnetically coupled together, which can be one primary winding with several turns implemented by Litz wire or PCB winding, and two one-turn secondary PCB windings.

Figure 9:
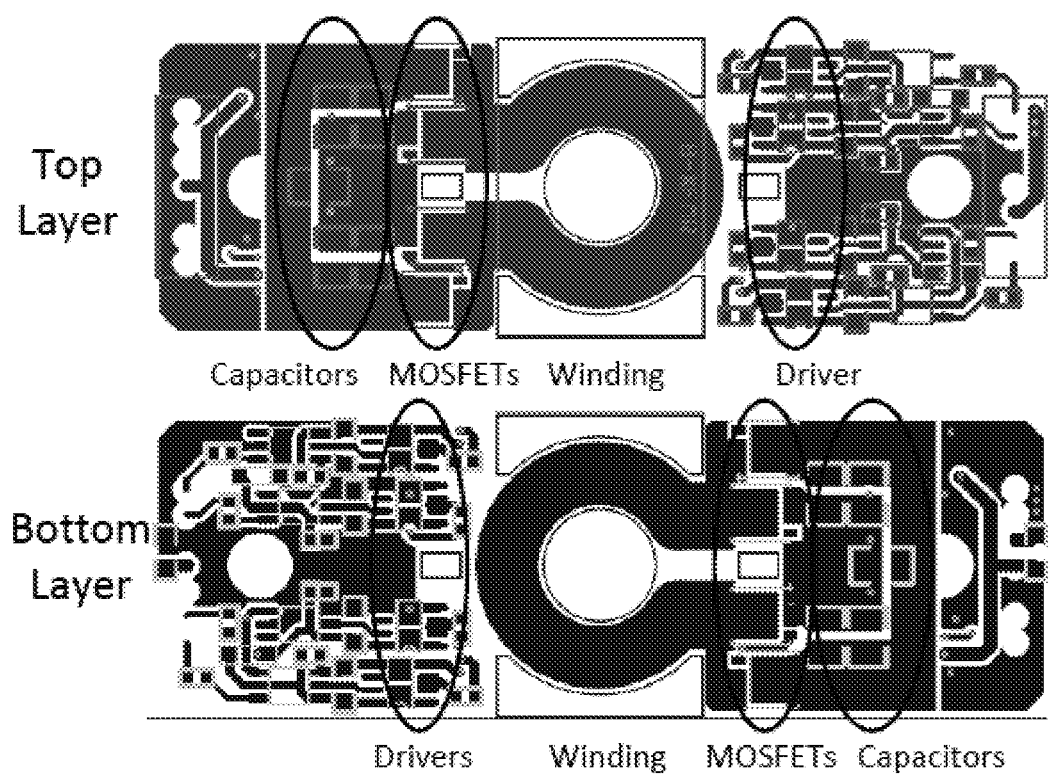
FIG. 9 illustrates the layout of one of the multi-core transformers and its two low voltage high current full bridges as disclosed herein.

The output of the secondary winding is directly connected to a full bridge converter locally. In the layout, the full bridge is put as closely as possible to the planar transformer to minimize power loss. The DC ports of all the secondary side full bridges are connected in parallel. To handle the large energy storage system's charging and discharging current, the transformer secondary windings and MOSFETs can be connected in parallel. A parallel connection for the full bridge in the DC port is better than a direct parallel connection between the transformer winding in the AC port and MOSFETs, since it avoids the winding AC termination loss. The two one-turn secondary winding and full bridges can be configured for electromagnetic symmetry. The current through each low-voltage, high-current winding and full bridge is balanced. In one or more embodiments, the multi-core based bidirectional DC-DC converter is implemented as shown in FIG. 9 and generally designated 510, with the layout arrangement of two low-voltage windings and two corresponding low-voltage full bridges coupled with the same transformer core.

The primary windings of several planar transformers are connected in series to increase the voltage gain. Depending on how many turns the planar transformer can accommodate, the primary windings can also be divided into several groups. In each group, the windings are connected in series, and the terminals of different groups can be connected in parallel to the high-voltage side half bridge. Two sections of the high-voltage windings are shown in FIG. 7 as an example. The advantage of this configuration is that it is possible to turn off half of the secondary side full bridges (i.e. it is possible to turn off one section) to improve the power conversion efficiency with a light load condition.

Figure 11A:
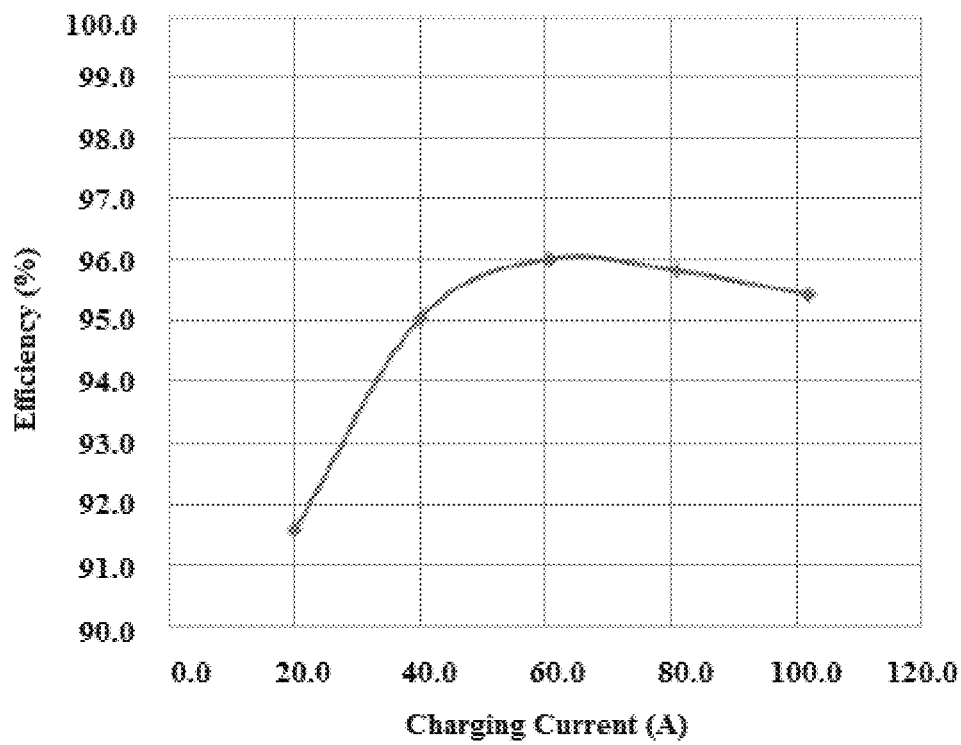
FIG. 11A illustrates experimental efficiency of a converter according to one or more embodiments based on one or more embodiments of modulation techniques disclosed herein.
Figure 11B:
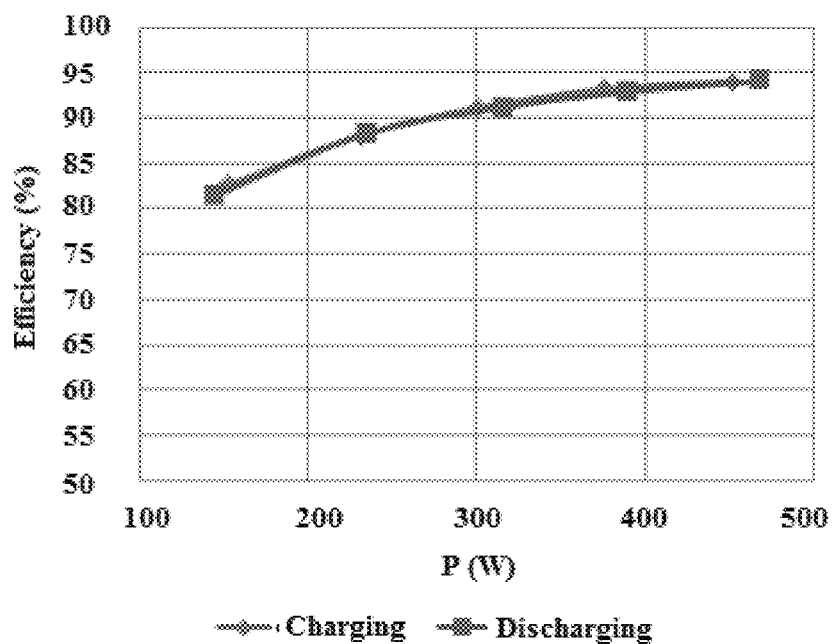
FIG. 11B illustrates experimental efficiency of charge and discharge of a converter according to one or more embodiments disclosed herein.

The tested efficiency for a 100 A multi-core bidirectional DC-DC converter prototype corresponding to FIG. 7 with one phase-shift angle modulation technique from light power to full power is shown in FIG. 11A. The efficiency during charge and discharge of the one or more 50 A multi-core bidirectional converters disclosed herein corresponding to FIG. 8 with two phase-shift angles modulation technique is illustrated in FIG. 11B.

The energy storage module side power stage has an extremely large current, and high frequency conditions. The di/dt is such that that the parasitic inductance due to the MOSFET package and PCB layout may have a big impact on the converter performance. The energy trapped in the parasitic inductance causes additional power loss and the associated ringing issue causes severe EMI to the system. The low-voltage and high-current side MOSFETs are exposed to significant current stress. Improvements in silicon technology have significantly reduced MOSFET RDS (on) and the amount of heat generated by power semiconductors to the point where packaging becomes a primary limitation in higher performance devices. Conventional wire-bonded SO-8 packages have many limitations. For example, there is large die-free package resistance (DFPR) (1.6 m Ohms is typical); 50% of total RDS (on) is due to internal source-to-lead bonding wires; internal wire bonds introduce parasitic inductance to the gate, drain, and source terminals; source parasitic inductance slows down the switching speed of MOSFETs, and generates significant ringing; there is high junction-to-PCB thermal resistance since the drain is attached to the lead frame, which is molded into a plastic; and there is high junction-to-case thermal resistance.

In addition to SO-8 package, some often used commercial low voltage and high current MOSFET package include but not limited to: DPAK, CopperStrap SO8 (PowerConnect), PowerPak, and DirectFET. The layout of one of the multi-core transformers and its two low-voltage high current full bridges are shown in FIG. 9. There are two one-turn, low-voltage and high-current windings for this planar transformer. One PCB winding is on the top layer; the other is on the bottom layer. Four MOSFETs with low package inductance are put next to the PCB winding to reduce the winding AC resistance. Filter capacitors are put next to the MOSFETs. The PCB winding, four MOSFETs, and filter capacitors are closely-spaced together as possible to minimize the high-frequency AC loop distance, such that both the loop resistance and parasitic inductance can be minimized. One-turn low-voltage and high-current winding can be used for a more compact layout of the secondary side transformer windings and full bridges. The MOSFET gate drive should be also put as closely as possible to the MOSFET. To this end, the driver IC is soldered on the back layer of the MOSFETs. Gate drivers on the bottom layer are aligned with the top layer, and vice versa. The layout of the two PCB windings and the two full bridges are completely symmetrical, which helps to balance the current of two bridges.

Several types of magnetic core materials can be considered for the high frequency integrated DC-DC converter of intelligent energy storage system applications. Core loss is one important consideration for high-frequency transformer design. At low frequencies, like the line frequency, the design will be limited by the saturation flux density. But at high frequency, the design will be limited by the core loss. A widely used calculation of specific core loss under sinusoidal excitation is the Steinmetz equation, $$P_{cv}=K \times f^{\alpha} \times B_{ac}^{\beta} \qquad (5)$$

where Bac is the peak flux density amplitude, Pcv is the time-average power loss per unit volume, f is the frequency of sinusoidal excitation, and K, $\alpha$, and $\beta$ are constants found by curve fitting. The Steinmetz equation coefficients were extracted for the magnetic core materials, where the unit for Pcv is mW/cm3, and f and Bac use kHz and Tesla, respectively.

Silicon steel materials have high saturation flux density (about 1.5 T) and high permeability. Some manufactures provide laminations with gauged down to 1 mm or 25 um. However, compared with other transformer magnetic materials, such as ferrite, nanocrystalline, and amorphous cores, their loss is relatively high when the frequency increases. So silicon steel materials are used often in the low frequency range from line frequency to several kHz.

Amorphous cores also exhibit high saturation induction (1.56 T) and high permeability. The core is laminated with 1 mm amorphous tape. The specific core loss is several times lower than silicon steel, but higher than that of nanocrystalline and ferrite cores. However, the cost of amorphous core is relatively low, and the performance to cost factor is excellent in the several kHz frequency range. The mechanical strength is good enough to build larger transformers. In addition, cut C-core with large geometry, and I-core formers, are commercially available, offering more design flexibilities. For low frequency applications, the peak magnetic flux density is one of the major limiting factors. High peak flux density can potentially be selected for amorphous materials in the several kHz range.

The nanocrystalline core materials may be useful for higher frequency ranges. The nanocrystalline core is metallic tape-wound core made of nanocrystalline soft magnetic material. This exhibits high saturation flux density (1.2 T) and extremely low specific loss (up to about 100 kHz frequency). 1.2 T saturation flux density allows the selection of high operating peak flux amplitude. Therefore, with nanocrystalline core materials, the high frequency transformer can potentially be configured to be more compact and efficient in the medium frequency range than the ferrite core design. However, there are also several disadvantages for nanocrystalline cores. The first is the relatively high material cost. Secondly, although special shapes in cut or uncut, oval or rectangular design can be produced, the standard off-the-shelf core shape is toroidal uncut tape-wound core.

Ferrite is a typical soft magnetic core material used for the tens of kHz to the several MHz range in high-frequency transformers. The ferrite core loss is very low, and the cost of ferrite core materials is also relatively cheap. However, there are two major disadvantages with using ferrite materials. The first is the low saturation flux density. At room temperature, it is around 0.4 T, and it becomes worse when core temperature increases. This can result in a larger core size in low frequency ranges due to limited peak flux density. The second disadvantage is that ferrite cores are brittle, making it difficult to build large transformer. However, ferrite materials are generally the favored when the frequency is above 100 kHz, since in the high-frequency range, the size is limited by the core loss instead of the saturation flux density. Ferrite core materials provide the lowest specific core loss from 100 kHz to several MHz.

Since there is only one turn for the secondary side low voltage and high-current winding, the frequency has to be boosted to several hundred kHz to achieve a reasonable magnetizing current and core size. Several ferrite soft magnetic core materials, such as 3C96, 3F3, 3F35, 3F4, and 3F45 from Ferroxcube, may be used for the multi-core bidirectional DC-DC converter design.

Figure 12:
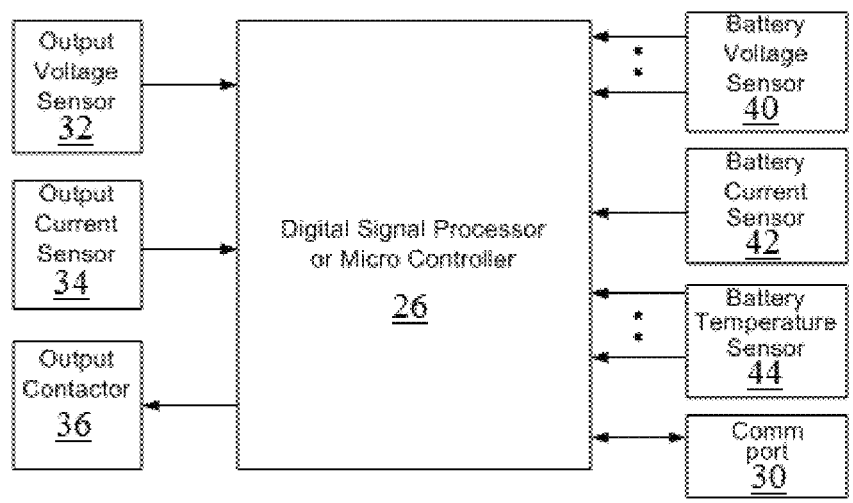
FIG. 12 illustrates a schematic of a controller for use with an energy storage module according to one or more embodiments disclosed herein.

Each module 12 may include controller 26 that has software or computer programmable code thereon for controlling the converter. A schematic of the controller is illustrated in FIG. 12. The controller 26 can be in communication with an output voltage sensor 32, an output current sensor 34, and an output contactor 36. Furthermore, the controller 26 can be in communication with an energy storage module voltage sensor 40, an energy storage module current sensor 42, an energy storage module temperature sensor 44, and the communication module 30.

The controller 26 and monitoring module 24 may be configured to communicate with each of the sensors to determine an operating condition and capacity of each relative module 12. For example, in communication with each of the sensors disclosed herein, the controller 26 and/or monitoring module 24 may monitor at least one of voltage, current, power, discharge rate, charge rate, temperature, and charge capacity of the energy storage source. Each controller 26 may be configured for switching the output contactor 36 of a respective energy storage module 12 based on the monitored characteristics. For example, the controller 26 may be configured for switching off the output contactor 36 of each respective energy storage module 12 if the monitored voltage of a respective energy storage module 12 is below a predetermined range.

The controller 26 and monitoring module 24 may be configured to determine if one of the energy storage sources 14 has failed and further configured for switching the output contactor 36 of a respective energy storage module 12 to open if it is determined that one of the energy sources 14 has failed. In this manner, the failed energy source 14 and associated module 12 are taken "off-line" in the parallel sequence of modules 12 and thus overcharging of other modules is avoided.

Figure 13:
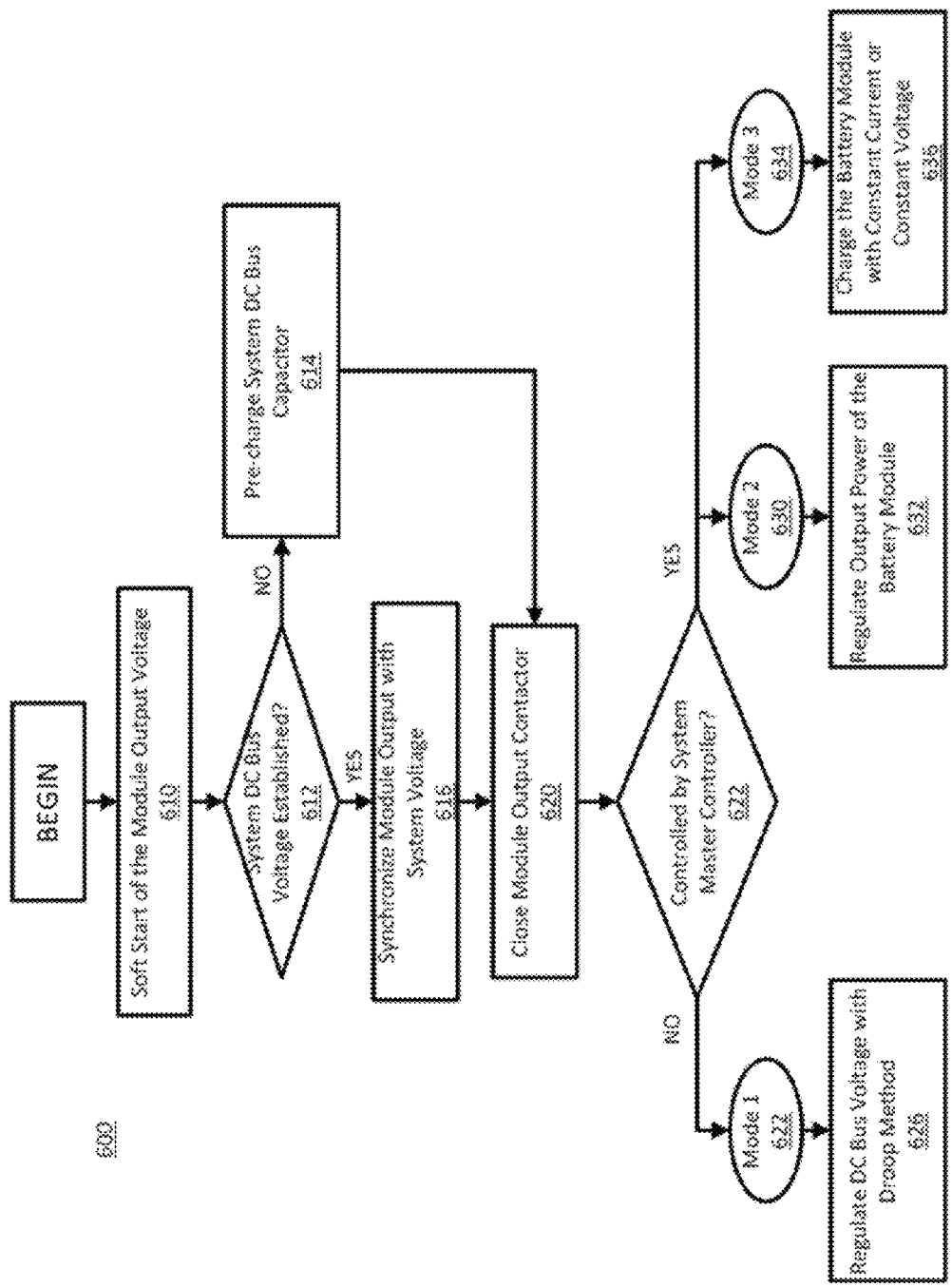
FIG. 13 illustrates a flowchart depicting operation of a controller for use according to one or more embodiments disclosed herein.
Figure 14:
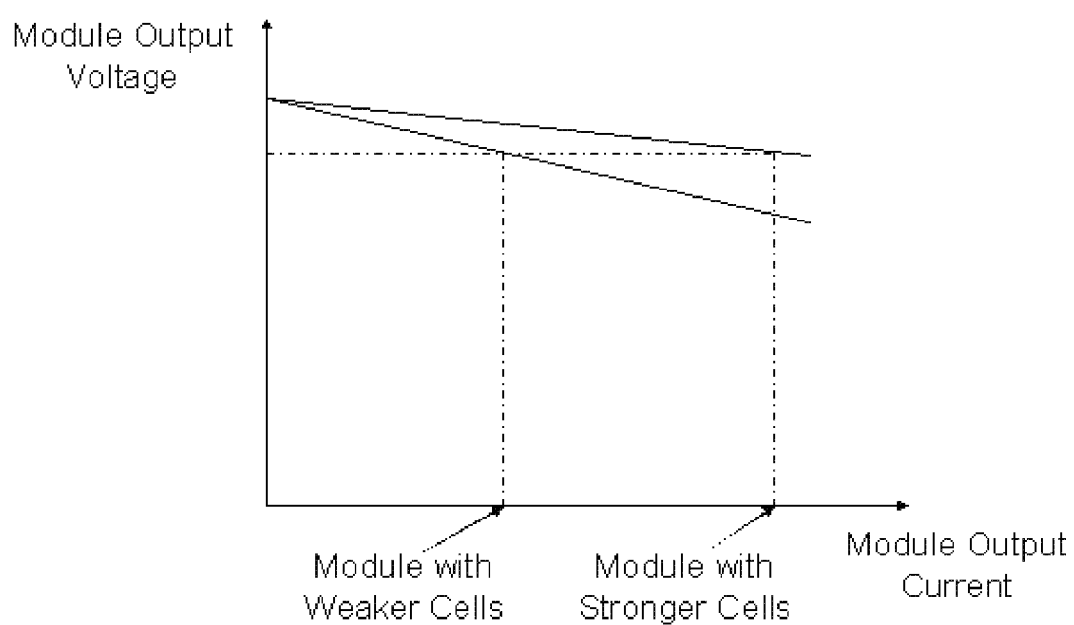
FIG. 14 illustrates the controlled module output voltage-current characteristic, where the module output voltage is dependent on module output current.

The flowchart illustrated in FIG. 13 details some operation modes of the controller 26. A method (600) is illustrated in the flow chart of FIG. 13. A first step includes a soft start of the module output voltage (610). If the electric device system DC bus voltage is established (612), then a step of synchronizing the module output with system voltage can occur (616), followed by a step of closing the module output contactor (620). If the system DC bus voltage is not established, a step of pre-charging the system DC bus capacitor occurs (614). The step of closing the module output contactor then occurs (620). A step of determining if the module is controlled by master system controller may then occur (622). If the module is not controlled by the master system controller, then the controller operates in Mode 1 624, in which the controller regulates DC bus voltage with droop method (626), as illustrated in FIG. 14. If the module is controlled by the master system controller, then the controller operates in either Mode 2 (630), in which the controller regulates output power of the battery module (632), or Mode 3 (634), in which the controller charges the battery module with constant current or constant voltage (636).

The one or more energy storage system include a single power source, or battery cell, or a few cells in series, to form a low-voltage output. The energy storage system can also include integrated high frequency bidirectional DC-DC converters, energy storage module monitors, controllers, high-voltage output terminals, and communication ports.

The above mentioned energy storage modules, or energy storage system can contain one single cell, a few cells in series from different types of batteries, or capacitors such as Li-ion, NiMH, Lead-acid, and super capacitors In the energy storage module, one side of the high-frequency bidirectional DC-DC converter can be connected to a low-voltage battery cell or battery pack, and the other side can be connected to high-voltage output terminals. An energy storage module monitor can supervise energy storage module, battery cell, or energy storage system characteristics, including the voltage, current, state of charge, state of the health and temperature, and transmit such information to the controller.

A battery cell or pack, a high-frequency bidirectional DC-DC converter, a battery monitor, and a controller can be mechanically packaged together to form an energy storage system. The high-voltage output terminals of multiple energy storage modules can be connected in parallel to increase the system's energy storage capacity. The scalability of the energy storage system's capacity can be obtained by selecting the number of energy storage modules to be connected in parallel. Multiple energy storage modules can be connected in parallel with high-voltage output terminals, which are connected by a common bus, to form an energy storage system.

An energy storage system can be directly plugged into the DC bus of an electrical device without an additional battery charger or DC-DC converter. An integrated bidirectional DC-DC converter can charge and discharge the modules, or cells, and regulate the module output voltage, current, or power.

A controller can control the integrated high-frequency DC-DC converter. In addition, the controller generates virtual output impedance for the module such that the output current can be balanced for all the modules without the real-time communication among modules. This allows for further control of module output voltage, current, or power.

The generated module virtual output impedance can be adaptive based on the operational strategy of the energy storage system. In one embodiment, a higher output virtual impedance is set for modules with a lower state of charge or state of health, and lower output virtual impedance is set for modules with higher state of charge or state of health, such that more current is sunk from stronger modules.

Planar high frequency transformers with PCB windings can be used to provide the high-voltage transfer ratio between the high-voltage output terminal and the low module input voltage. A low profile can be obtained with planar transformers. In one embodiment, the planar transformers are connected in series with high-voltage windings, and connected in parallel with low-voltage bridges.

When one module fails, it can be disconnected from the rest of the modules in the system, and it can be isolated such that the whole energy storage system only loses part of its energy storage capacity.

The energy storage modules can be plugged into the system without shutting down the system, and determine an operational strategy automatically based on direction from included controllers.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with preferred embodiments of the various figures, it is to be understood that other similar embodiments may be used, and modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An energy storage system comprising:
    a plurality of energy storage modules configured to operate together, each energy storage module having:
        an energy storage source;
        a bi-directional current converter configured for supplying charge to the energy storage source from a power source and for discharging current for use by an electrical device, wherein the bi-directional current converter is integrated with the energy storage source in each energy storage module;
        a monitoring module configured to monitor an operating condition and capacity of the energy storage source; and
        a controller configured to switch off the energy storage source based on the monitored operating condition and capacity of the energy storage unit, and to produce a respective output signal for each module; and
    a communications module in connection with each output signal of the energy storage modules and configured for communicating a combined output signal with one of the power source and the electrical device.

2. The energy storage system of claim 1,
    wherein each monitoring module is configured to monitor at least one of voltage, current, power, discharge rate, charge rate, temperature, and charge capacity of the energy storage source; and
    wherein each controller is configured for switching an output contactor of a respective energy storage module based on the monitored characteristics.

3. The energy storage system of claim 2, wherein the controller is configured for switching off the output contactor of each respective energy storage module if the monitored voltage of a respective energy storage module is below a predetermined range.

4. The energy storage system of claim 1,
    wherein each monitoring module is configured to determine if one of the energy storage sources has failed; and
    wherein each controller is configured for switching the contact of a respective energy storage module to open if it is determined that one of the energy sources has failed.

5. The energy storage system of claim 1, further including a system master controller configured for communication with the communications module and each controller of each energy storage module.

6. The energy storage system of claim 5, wherein the system master controller is configured to regulate the output signal for each energy storage module.

7. The energy storage system of claim 6, wherein the system master controller is configured for controlling the communications module to charge respective energy storage modules with the power source.

8. The energy storage system of claim 6, wherein controlling the communications module to charge respective energy storage modules with the power source comprises charging respective energy storage modules with one of constant current and constant voltage.

9. The energy storage system of claim 6, wherein the system master controller is configured to regulate the output signal for each energy storage module to the desired combined output signal.

10. The energy storage system of claim 1, wherein each monitoring module is independently controllable relative to other monitoring modules.

11. The energy storage system of claim 1, wherein the converter is one of a bidirectional DC-DC converter, a bidirectional DC-AC converter, a current amplitude converter, or voltage amplitude converter.

12. The energy storage system of claim 1, wherein the energy storage source comprises at least one of batteries, capacitors, photovoltaic arrays, and power grids.

13. The energy storage system of claim 1, wherein the plurality of energy storage modules are connected in one of a parallel configuration and serial configuration.

14. The energy storage system of claim 1, wherein the controller is configured to operate in at least two modes for regulating DC bus voltage.

15. A method of controlling an energy storage system having a plurality of energy storage modules configured to operate together, the method comprising:
    providing an energy storage source;
    supplying charge to the energy storage source from a power source using a bi-directional current converter;
    discharging current to an electrical device from the energy storage source using the bi-directional current converter, wherein the bi-directional current converter is integrated with the energy storage source in each energy storage module;

monitoring an operating condition and capacity of the energy storage source using a monitoring module;

controlling the bi-directional current converter to switch off the energy storage source based upon the monitored operating condition and capacity of the energy storage unit, and to produce a respective output signal for each module; and communicating a combined output signal with one of the power source and the electrical device.

16. The method of claim 15, wherein switching an output contactor of a respective energy module comprises switching an output contactor with a controller of each respective energy module.

17. The method of claim 15, further comprising determining if one of the energy storage sources has failed; and switching the contact of a respective energy storage module to open if it is determined that one of the energy sources has failed.

18. A computer program product for enabling control an energy storage system having a plurality of energy storage modules configured to operate together, the computer program product comprising:

a non-transitory computer readable storage medium having computer readable program code embodied therewith, the computer readable program code comprising:

computer readable program code configured to supply charge to an energy storage source from a power source using a bi-directional current converter;

computer readable program code configured to discharge current to an electrical device from the energy storage source using the bi-directional current converter, wherein the bi-directional current converter is integrated with the energy storage source in each energy storage module;

computer readable program code configured to monitor an operating condition and capacity of the energy storage source using a monitoring module;

computer readable program code configured to control the bi-directional current converter to switch off the energy storage source based upon the monitored operating condition and capacity of the energy storage unit, and to produce a respective output signal for each module; and computer readable program code configured to communicate a combined output signal with one of the power source and the electrical device.

19. The computer program product of claim 18, wherein the computer readable program code is further configured to:

switch an output contactor with a controller of each respective energy module.

20. The computer program product of claim 18, wherein the computer readable program code is further configured to:

determine if one of the energy storage sources has failed; and switch the contact of a respective energy storage module to open if it is determined that one of the energy sources has failed.

* * * * *

UNITED STATES PATENT AND TRADEMARK OFFICE
CERTIFICATE OF CORRECTION

| | | Page 1 of 1 |
|---|---|---|
| PATENT NO. | : 9,444,275 B2 | |
| APPLICATION NO. | : 13/600280 | |
| DATED | : September 13, 2016 | |
| INVENTOR(S) | : Qin Huang and Yu Du | |

It is certified that error appears in the above-identified patent and that said Letters Patent is hereby corrected as shown below:

In the Specification

Please replace the paragraph at Line 15 of Column 1 with the following:
-- This invention was made with government support under grant number 0812121 awarded by the National Science Foundation. The government has certain rights in the invention. --

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*